United States Patent
Ono et al.

(10) Patent No.: US 10,115,534 B2
(45) Date of Patent: Oct. 30, 2018

(54) ALL-SOLID-STATE CAPACITOR WITH SOLID ELECTROLYTE HAVING A POLYCRYSTALLINE STRUCTURE

(71) Applicants: KYOCERA Corporation, Kyoto-shi, Kyoto (JP); ENERGY STORAGE MATERIALS LLC., Fujisawa-shi, Kanagawa (JP)

(72) Inventors: Tomoyuki Ono, Kirishima (JP); Seiichirou Hirahara, Kirishima (JP); Fumito Furuuchi, Kagoshima (JP); Maiko Nagayoshi, Kirishima (JP); Youji Seki, Kagoshima (JP); Takaaki Tsurumi, Fujisawa (JP)

(73) Assignees: KYOCERA CORPORATION, Kyoto-Shi, Kyoto (JP); ENERGY STORAGE MATERIALS LLC., Fujisawa-Shi, Kanagawa (JP)

( * ) Notice: Subject to any disclaimer, the term of this patent is extended or adjusted under 35 U.S.C. 154(b) by 160 days.

(21) Appl. No.: 15/022,644

(22) PCT Filed: Sep. 29, 2014

(86) PCT No.: PCT/JP2014/075958
§ 371 (c)(1),
(2) Date: Mar. 17, 2016

(87) PCT Pub. No.: WO2015/046538
PCT Pub. Date: Apr. 2, 2015

(65) Prior Publication Data
US 2016/0233032 A1    Aug. 11, 2016

(30) Foreign Application Priority Data

Sep. 30, 2013 (JP) .................................. 2013-204050
Sep. 30, 2013 (JP) .................................. 2013-204051

(51) Int. Cl.
*H01G 11/56* (2013.01)
*H01G 9/032* (2006.01)
(Continued)

(52) U.S. Cl.
CPC .............. *H01G 11/56* (2013.01); *H01G 9/032* (2013.01); *H01G 9/15* (2013.01); *H01G 11/68* (2013.01); *Y02E 60/13* (2013.01)

(58) Field of Classification Search
CPC .......... H01G 11/56; H01G 11/68; H01G 9/15; H01G 9/032
See application file for complete search history.

(56) References Cited

U.S. PATENT DOCUMENTS 8,128,988 B2 * 3/2012 Yasumoto ............. C04B 41/009
427/100
2008/0117563 A1   5/2008 Nagata et al.
(Continued)

FOREIGN PATENT DOCUMENTS

CN    102859779 A   1/2013
JP    2008-130844 A   6/2008
(Continued)

OTHER PUBLICATIONS

Chinese Office Action with English concise explanation, Chinese Patent Application No. 201480049248.5, Jul. 4, 2017, 8 pgs.
(Continued)

*Primary Examiner* — David M Sinclair
(74) *Attorney, Agent, or Firm* — Volpe and Koenig, P.C.

(57) ABSTRACT

The disclosure relates to an all-solid-state capacitor which has a high capacitance, is excellent in frequency characteristics, and can be made compact. An all-solid-state capacitor of the disclosure includes an inorganic solid electrolyte, and a pair of current collectors disposed so as to hold the inorganic solid electrolyte in between, the inorganic solid
(Continued)

electrolyte having a main crystal phase of perovskite crystal structure that is expressed by a general formula, $ABO_3$. A-site elements include two different elements, namely Li and M which is at least one of elements in Group 2 of the Periodic Table of Elements, and B-site elements include two different elements, namely Ti and M' which is at least one of elements in Group 5 of the Periodic Table of Elements.

12 Claims, 4 Drawing Sheets

(51) Int. Cl.
*H01G 9/15* (2006.01)
*H01G 11/68* (2013.01)

(56) References Cited

U.S. PATENT DOCUMENTS

| | | | |
|---|---|---|---|
| 2008/0220334 A1* | 9/2008 | Inda | C03C 4/18 |
| | | | 429/322 |
| 2010/0014214 A1 | 1/2010 | Yamazaki et al. | |
| 2011/0059369 A1* | 3/2011 | Nan | H01M 10/0525 |
| | | | 429/322 |
| 2012/0162854 A1 | 6/2012 | Iwanaga | |
| 2012/0237835 A1 | 9/2012 | Yada et al. | |
| 2014/0193718 A1 | 7/2014 | Harada et al. | |
| 2014/0308590 A1* | 10/2014 | Ohta | H01B 1/122 |
| | | | 429/403 |
| 2015/0099197 A1* | 4/2015 | Nakashima | C04B 35/462 |
| | | | 429/405 |

FOREIGN PATENT DOCUMENTS

| | | |
|---|---|---|
| JP | 2011-529243 A | 12/2011 |
| JP | 2012-138502 A | 7/2012 |
| JP | 5046700 B | 10/2012 |
| JP | 2013-134812 A | 7/2013 |
| WO | 2011/128976 A1 | 10/2011 |
| WO | 2013/140574 A1 | 9/2013 |

OTHER PUBLICATIONS

Yoshiyuki Inaguma, "Fast Percolative Diffusion in Lithium Ion-conducting Perovskite-type Oxides," Journal of the Ceramic Society of Japan, 114 [12], pp. 1103-1110, (2006).
International Search Report, PCT/JP2014/075958, Dec. 22, 2014, 2 pgs.
Japanese Office Action with English concise explanation, Japanese Patent Application No. 2015-539440, Apr. 4, 2017, 5 pgs.
Mei et al., "Enhanced ionic transport in lithium lanthanum titanium oxide solid state electrolyte by introducing silica," Solid State Ionics, NL, Elsevier; Amsterdam, 2008, vol. 179, pp. 2255-2259.

* cited by examiner

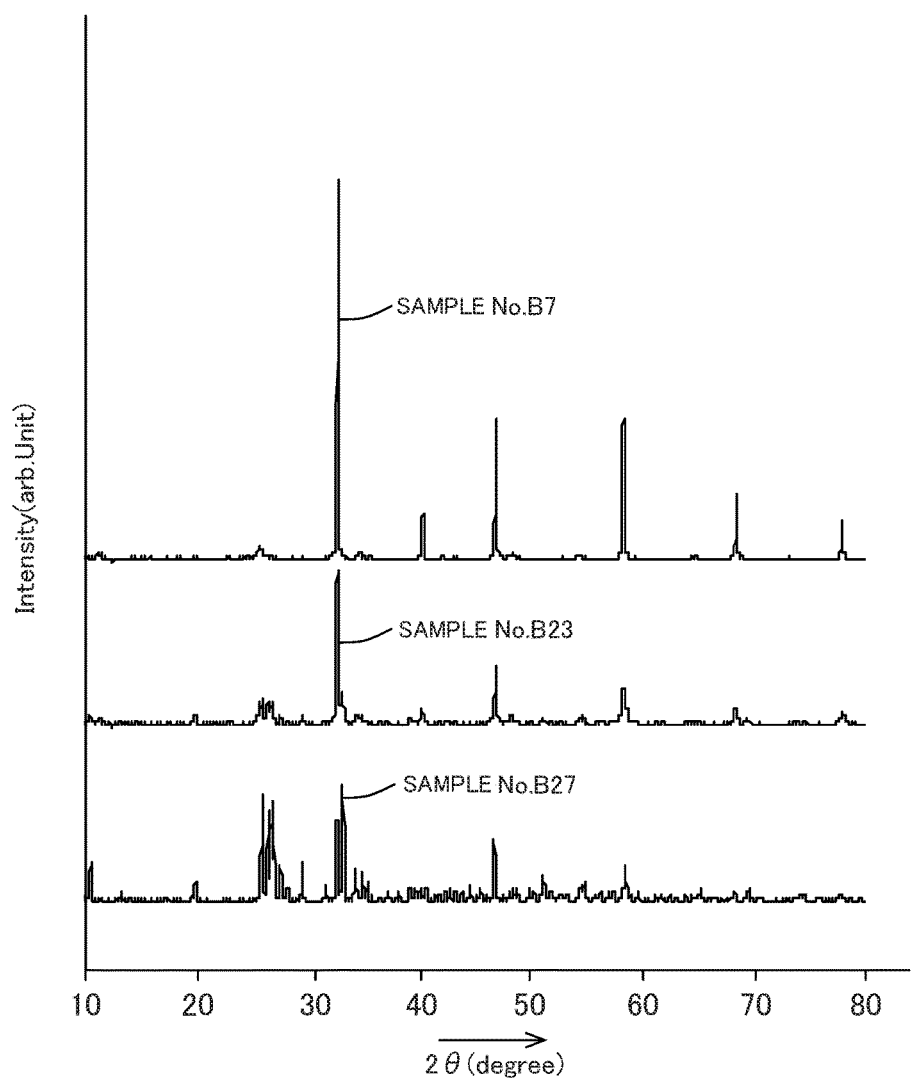

ALL-SOLID-STATE CAPACITOR WITH SOLID ELECTROLYTE HAVING A POLYCRYSTALLINE STRUCTURE

TECHNICAL FIELD

The present invention relates to an all-solid-state capacitor, and more particularly to a solid electrolyte of the all-solid-state capacitor.

BACKGROUND ART

In addition to higher level of performance capability, further downsizing is demanded in various electronic equipment, including information equipment, communications equipment, and household electrical appliances, and this trend has created a need for each electronic component to be mounted in electronic equipment to be adapted for the sophisticated and downsized electronic equipment. One of electronic components that are mounted in electronic equipment is a capacitor. Capacitance is a performance characteristic demanded in a capacitor, wherefore the capacitor needs to be designed to have a small general size yet provide a high capacitance.

Multilayer ceramic capacitors described in Patent Literatures 1 and 2 utilize barium titanate as a dielectric body, and achieve a high capacitance by increasing the relative permittivity of the dielectric body.

Moreover, a general electric double layer capacitor utilizes an electrolytic solution of, for example, diluted sulfuric acid as an electrolyte, and achieves a high relative permittivity by collecting ions of the electrolytic solution in a current collector having a large specific surface area such as activated carbon.

CITATION LIST

Patent Literature

Patent Literature 1: Japanese Examined Patent Publication JP-B2 5046700
Patent Literature 2: Japanese Unexamined Patent Publication JP-A 2012-138502

SUMMARY OF INVENTION

Technical Problem

Barium titanate has a relative permittivity in the order of about a few thousand to ten thousand. Thus, with the multilayer ceramic capacitors described in Patent Literatures 1 and 2, it will be difficult to achieve both a high capacitance and downsizing.

Moreover, in the general electric double layer capacitor, ions in the electrolytic solution need to be collected in the current collector to attain a high relative permittivity. In this case, responsiveness to a power-source driving frequency is so low that there arises a considerable reduction in relative permittivity at a frequency of about 1 Hz or above. More specifically, it will be difficult to attain a high relative permittivity of 5000 or above at a driving frequency of 1 kHz.

Furthermore, in the electric double layer capacitor using an electrolytic solution, liquid leakage may occur, wherefore a watertight structure needs to be added for prevention of the liquid leakage. Thus, there is a demand for an all-solid-state capacitor which utilizes a solid electrolyte. However, even the all-solid-state capacitor may have poor frequency characteristics, for example, a decrease in relative permittivity at a high frequency as described above.

An object of the invention is to provide an all-solid-state capacitor which has a high capacitance, is excellent in frequency characteristics, and can be made compact.

Solution to Problem

According to one aspect of the invention, an all-solid-state capacitor includes:
an inorganic solid electrolyte having a polycrystalline structure, the polycrystalline structure being composed of crystal particles and a crystal grain boundary formed between the crystal particles; and
a pair of current collectors disposed so as to hold the inorganic solid electrolyte in between,
the inorganic solid electrolyte having a main crystal phase of perovskite crystal structure that is expressed by a general formula, $ABO_3$,
A-site elements of the main crystal phase comprising Li and M which is at least one of elements in Group 2 of the Periodic Table of Elements, and
B-site elements comprising Ti and M' which is at least one of elements in Group 5 of the Periodic Table of Elements.

According to another aspect of the invention, the main crystal phase may be expressed by a compositional formula, $Li_xM_{(2-x-\alpha)/2}Ti_{1-\alpha}M'_\alpha O_3$ in which $0.5 \leq \alpha \leq 0.7$ and $0.03 \leq x(\alpha-x)/2 \leq 0.06$.

According to another aspect of the invention, the element M may include Sr.

Moreover, according to another aspect of the invention, an all-solid-state capacitor includes:
an inorganic solid electrolyte having a polycrystalline structure, the polycrystalline structure being composed of crystal particles and a crystal grain boundary formed between the crystal particles; and
a pair of current collectors disposed so as to hold the inorganic solid electrolyte in between,
the inorganic solid electrolyte having a main crystal phase of perovskite crystal structure that is expressed by a general formula, $ABO_3$, and comprises Li, La, Ti, and M' which is at least one of elements in Group 5 of the Periodic Table of Elements, and
the main crystal phase being expressed by a compositional formula, $Li_xLa_{(2-x-\alpha)/3}Ti_{(1-\alpha)}M'_\alpha O_3$ in which $x \leq 0.5$, and $\alpha \leq 0.13$.

According to another aspect of the invention, M', which is at least one of elements in Group 5 of the Periodic Table of Elements, may include at least one of Nb and Ta.

According to another aspect of the invention, a grain boundary phase composed of an amorphous phase or a crystal phase which differs from the main crystal phase may be present at the crystal grain boundary of the crystal particles composed of the main crystal phase.

According to another aspect of the invention, the grain boundary phase may comprise at least one element of Si and Ge.

According to another aspect of the invention, an electrical resistivity at the crystal grain boundary in the inorganic solid electrolyte may be greater than or equal to $5 \times 10^2$ $\Omega \cdot m$.

According to another aspect of the invention, the all-solid-state capacitor may include an electric double layer capacitor.

Advantageous Effects of Invention

According to one aspect of the invention, there is provided an all-solid-state capacitor comprising: an inorganic solid electrolyte having a polycrystalline structure, the polycrystalline structure being composed of crystal particles and a crystal grain boundary formed between the crystal particles; and a pair of current collectors disposed so as to hold the inorganic solid electrolyte in between. The inorganic solid electrolyte has a main crystal phase of perovskite crystal structure that is expressed by a general formula, $ABO_3$.

A-site elements comprise two different elements, namely Li and M which is at least one of elements in Group 2 of the Periodic Table of Elements, and B-site elements comprise two different elements, namely Ti and M' which is at least one of elements in Group 5 of the Periodic Table of Elements.

In the aforestated inorganic solid electrolyte, in the perovskite crystal structure expressed by the general formula, $ABO_3$ defining the main crystal phase, Li and M which is at least one of elements in Group 2 reside in the A site, and Ti and M' which is at least one of elements in Group 5 reside in the B site. In this case, vacancies are developed in the A site, thus allowing Li ions to migrate within the crystals of a perovskite-structured composite oxide. Moreover, in the inorganic solid electrolyte, Li ions can be accumulated at the interface between the inorganic solid electrolyte and the current collector, and at the crystal grain boundary of the inorganic solid electrolyte, wherefore an electric double layer of high specific capacity can be formed by exploiting interfacial polarization that occurs at the interface between the inorganic solid electrolyte and the current collector, and at the crystal grain boundary of the inorganic solid electrolyte.

By applying the inorganic solid electrolyte having such characteristics to an electric double layer capacitor, it is possible to implement an all-solid-state capacitor which has a high capacitance, is excellent in frequency characteristics, and can be made compact.

Moreover, according to another aspect of the invention, there is provided an all-solid-state capacitor comprising an inorganic solid electrolyte and a pair of current collectors disposed so as to hold the inorganic solid electrolyte in between. The inorganic solid electrolyte has a main crystal phase of perovskite crystal structure comprising Li, La, Ti, and M' which is at least one of elements in Group 5 of the Periodic Table of Elements (pentavalent metal element), and, the main crystal phase is expressed by the compositional formula given above.

In the perovskite crystal structure, which is generally represented as $ABO_3$, having a composition expressed by the above-mentioned compositional formula, Li ions are allowed to migrate within the crystals of the composite oxide of perovskite crystal structure via vacancies in the A site comprising Li and La. Moreover, in the inorganic solid electrolyte whose main crystal phase has a composition expressed by the above-mentioned compositional formula, since the Li ions can be accumulated at the interface between the inorganic solid electrolyte and the current collector, and at the crystal grain boundary of the inorganic solid electrolyte, it is possible to form an electric double layer of high specific capacity by exploiting interfacial polarization that occurs at the interface between the inorganic solid electrolyte and the current collector, and at the crystal grain boundary of the inorganic solid electrolyte. Thus, by applying the inorganic solid electrolyte having such characteristics to an electric double layer capacitor, it is possible to implement an all-solid-state capacitor which has a high capacitance, is excellent in frequency characteristics, and can be made compact.

BRIEF DESCRIPTION OF DRAWINGS

FIG. 4 is a chart indicating X-ray diffraction (XRD) patterns of the inorganic solid electrolyte of a second embodiment.

DESCRIPTION OF EMBODIMENTS

First Embodiment

Figure 1:
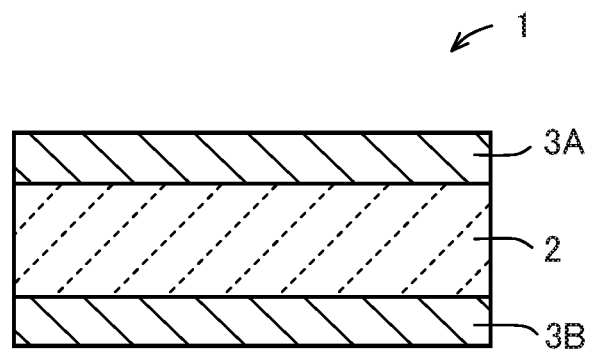
FIG. 1 is a sectional view schematically showing the structure of an all-solid-state capacitor 1 in accordance with an embodiment of the invention.

An all-solid-state capacitor 1 of this embodiment comprises an inorganic solid electrolyte 2 and a pair of current collectors 3A and 3B disposed so as to hold the inorganic solid electrolyte 2 in between, and, the inorganic solid electrolyte 2 has a main crystal phase of perovskite crystal structure that is expressed by a general formula, $ABO_3$. In the perovskite crystal structure, A-site elements comprise two different elements, namely Li and M which is at least one of elements in Group 2 of the Periodic Table of Elements, and, B-site elements comprise two different elements, namely Ti and M' which is at least one of elements in Group 5 of the Periodic Table of Elements. In the present embodiment, with reference to a ratio between a peak intensity in the perovskite crystal structure and a peak intensity in other crystal structure than the perovskite crystal structure based on an X-ray diffraction pattern obtained by X-ray diffraction measurement (the details thereof will be given later), when the proportion of the peak intensity in the other crystal structure is less than or equal to 30%, then the perovskite crystal structure will be defined as the main crystal phase.

In the case where the A-site elements and the B-site elements are constituted by the above-mentioned combination of elements, vacancies are developed in the A site, thus allowing Li ions to pass through the vacancies for smooth migration within crystals. During the migration within the crystals, Li ions are accumulated at the interfaces between the inorganic solid electrolyte 2 and the current collectors 3A and 3B, and at the crystal grain boundary of the inorganic solid electrolyte 2. Upon accumulation of Li ions, interfacial polarization occurs at the interfaces between the inorganic solid electrolyte 2 and the current collectors 3A and 3B, and at the crystal grain boundary of the inorganic solid electrolyte 2, wherefore an electric double layer capacitor of high specific capacity can be formed by exploiting the interfacial polarization.

Moreover, with the thereby structured inorganic solid electrolyte 2, a sufficiently high relative permittivity can be achieved even at a relatively high frequency, for example, at 1 kHz. This allows the capacitor to achieve a sufficiently high capacitance even at a relatively high drive frequency of power supply.

As a composite oxide having a perovskite crystal structure that is used for the inorganic solid electrolyte 2 of the all-solid-state capacitor 1, LLTO, which is expressed in compositional formula as $La_{2/3-x}Li_{3x}TiO_3$, is known. In contrast to LLTO, in the above-mentioned inorganic solid electrolyte 2, since the A-site elements comprise only two elements, namely Li and M, there is no need to use La which is an expensive element having a disadvantage of a lack of stability in material supply. Thus, it is possible to provide the all-solid-state capacitor 1 at lower costs under steady product supplies.

In the present embodiment, when the inorganic solid electrolyte 2 has a main crystal phase expressed by the following compositional formula (A), the relative permittivity of the inorganic solid electrolyte 2 can be further increased, thus allowing the capacitor to achieve an even higher capacitance.

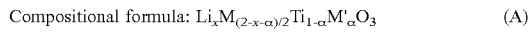

Compositional formula: $Li_xM_{(2-x-\alpha)/2}Ti_{1-\alpha}M'_\alpha O_3$ (A)

in which $0.5 \leq \alpha \leq 0.7$; and $0.03 \leq x(\alpha-x)/2 \leq 0.06$.

In the composition of the main crystal phase, by setting $\alpha$ and $x(\alpha-x)/2$ at values within the ranges as described above, it is possible to secure a sufficient amount of Li ions required to attain high permittivity, as well as to provide adequate pathways passing through vacancies in the A site, which serve as transmission pathways for Li ions that migrate within crystals. This makes it possible to implement a capacitor which has an even higher capacitance and affords excellent frequency characteristics.

When the value of $\alpha$ is less than 0.5, it is impossible to cause admission of Li ions in adequate numbers into the A site, which results in failure to obtain high permittivity. Furthermore, since the number of vacancies that can be admitted in the A site is small, the Li ion transmission pathways cannot be provided satisfactorily, which results in failure to obtain excellent frequency characteristics. When the value of a is greater than 0.7, the number of M ions that can be admitted in the A site is so small that the perovskite crystal structure cannot be maintained properly, which results in failure to attain sufficiently high relative permittivity.

Moreover, when the product of x and A-site vacancy amount Va, which is expressed in equation as $x \cdot Va = x(\alpha-x)/2$, is less than 0.03, it is impossible to cause admission of Li ions in adequate numbers into the A site, which results in failure to obtain high permittivity. Furthermore, the number of vacancies that can be admitted in the A site is so small that the Li ion transmission pathways cannot be provided satisfactorily, which results in failure to obtain excellent frequency characteristics. When the product of x and A-site vacancy amount Va: $x(\alpha-x)/2$ is greater than 0.06, the number of M ions that can be admitted in the A site is so small that the perovskite crystal structure cannot be maintained properly, which results in failure to attain sufficiently high relative permittivity.

Now, "$x(\alpha-x)/2$" representing the product of x and A-site vacancy amount Va will be explained. A-site vacancy amount Va is represented as $1-x-((2-x-a)/2)$, and, $1-x-((2-x-\alpha)/2)$ can be equated to $(\alpha-x)/2$.

In the above-mentioned compositional formula (A), the product of x representing Li content and $(\alpha-x)/2$ representing A-site vacancy amount is considered to be a measure of electrical conductivity related to Li ion migration on the basis of the percolation theory.

For example, according to "Fast Percolative Diffusion in Lithium Ion-conducting Perovskite-type Oxides" written by Yoshiyuki INAGUMA in Journal of the Ceramic Society of Japan 114 [12] p. 1103-1110 (2006), in a composite oxide of perovskite crystal structure, namely $La_{2/3-x}Li_{3x}TiO_3$, there is a proportionality between electrical conductivity σ related to Li ion migration via A-site vacancies and the product of 3x representing Li content and ⅓−2x representing A-site vacancy amount, which is expressed as $3x(⅓-2x)$.

Also in the present embodiment, since the inorganic solid electrolyte 2 has a main crystal phase of perovskite crystal structure, it follows that the product of x representing Li content and $(\alpha-x)/2$ representing A-site vacancy amount, namely $x(\alpha-x)/2$, is defined as a measure of electrical conductivity related to Li ion migration.

In the present embodiment, it is desirable to use Sr as M which is at least one of elements in Group 2 of the Periodic Table of Elements, and serves as the A-site element together with Li, and also use one of Nb and Ta or two of them as M' which is at least one of elements in Group 5 of the Periodic Table of Elements, and serves as the B-site element together with Ti.

The capacitor of the present embodiment is preferably designed so that lithium ions migrate mainly within crystal grains in the inorganic solid electrolyte 2. In light of this, the inorganic solid electrolyte 2 has preferably a thickness such that about several to ten crystal particles are present therein. More specifically, the inorganic solid electrolyte 2 has a thickness of 0.5 to 20 μm, or preferably a thickness of 1 to 10 μm. By adjusting the thickness of the inorganic solid electrolyte 2 to fall within such a range, it is possible to reduce variations in capacitance with different frequencies of voltage to be applied to the capacitor, in other words, frequency dependence of capacitance, and thereby implement a stable capacitor.

Moreover, in the all-solid-state capacitor 1 of the present embodiment, the current collectors 3A and 3B are each made of a metal material composed predominantly of at least one or more substances selected from among Au, Ag, and Cu, for example. Although the thicknesses of each of the current collectors 3A and 3B is not limited to any particular value, for example, it falls in the range of 0.5 to 3.0 μm.

Moreover, in the inorganic solid electrolyte 2 constituting the all-solid-state capacitor 1 of the present embodiment, as a different phase, one substance or two or more substances selected from among $LiNbO_3$, $Sr_6Nb_{10}O_{30}$, $Li_{10}Nb_6Ti_5O_m$, $Li_4Nb_2TiO_9$, and $LiTaO_3$ may additionally be contained so as to lie between crystal particles composed of the perovskite-structured main crystal phase. The presence of such a different phase makes it possible to impart higher electrical insulation capability to the inorganic solid electrolyte 2, and thereby allow the capacitor to afford high reliability even under application of high voltage or repetition of charge and discharge over a long period of time. In addition, occurrence of leakage current can be suppressed.

Moreover, the inorganic solid electrolyte 2 may include, at the crystal grain boundary of crystal particles composed of the main crystal phase, a grain boundary phase composed of an amorphous phase or a crystal phase which differs from the main crystal phase, and this grain boundary phase may contain the element in Group 14 of the Periodic Table of Elements, and more specifically may contain Si or Ge. The crystal phase is composed of, for example, an oxide containing the element in Group 14 of the Periodic Table of Elements, such as $SiO_2$ or $GeO_2$, and, the amorphous phase is composed of, for example, glass containing the element in Group 14 of the Periodic Table of Elements, such as Si or Ge. The grain boundary phase may contain both of the crystal phase and the amorphous phase. The grain boundary phase may also contain Ti which is part of the constituents of the main crystal phase.

In the presence of such a grain boundary phase, the grain boundary resistance between crystal particles can be increased, and frequency dependence of the capacitance of the inorganic solid electrolyte 2 can be reduced, thus implementing a stable capacitor. Moreover, the electrical resistivity of the crystal grain boundary is preferably greater than or equal to $5 \times 10^2$ Ω·m.

The following describes an example of methods for manufacturing the all-solid-state capacitor 1 of the present embodiment.

In forming the all-solid-state capacitor 1, for example, the inorganic solid electrolyte 2 is fired first, and subsequently the current collectors 3A and 3B made of a metal material such as Au, Ag, or Cu are formed on the surface of the fired inorganic solid electrolyte 2 using an ion sputtering apparatus or otherwise. For example, the inorganic solid electrolyte 2 can be produced by following a procedure comprising a raw material mixing step, a primary pulverization step, a calcination step, a secondary pulverization step, and a firing step. For example, calcination is performed at a temperature of 1100° C. and under retention time of 2 hours, and, firing is performed at a temperature of 1100° C. and under retention time of 6 hours. In this way, the inorganic solid electrolyte 2 can be produced.

Second Embodiment

An all-solid-state capacitor 1 of this embodiment comprises an inorganic solid electrolyte 2 and a pair of current collectors 3A and 3B disposed so as to hold the inorganic solid electrolyte 2 in between. The inorganic solid electrolyte 2 has a main crystal phase of perovskite crystal structure, which is expressed by a general formula, $ABO_3$, comprising Li (lithium), La (lanthanum), Ti (titanium), and M' which is at least one of elements in Group 5 of the Periodic Table of Elements (pentavalent metal element), and, the main crystal phase has a composition expressed by the following compositional formula (B).

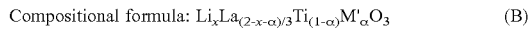

Compositional formula: $Li_xLa_{(2-x-\alpha)/3}Ti_{(1-\alpha)}M'_\alpha O_3$     (B)

in which $x \leq 0.5$, and $\alpha \leq 0.13$.

The main crystal phase of the inorganic solid electrolyte 2 is determined by analyzing an X-ray diffraction (XRD) pattern obtained by X-ray diffraction measurement using an X-ray diffractometer. In the present embodiment, when a ratio of the peak intensity of a main peak indicative of a different phase (P2) to the peak intensity of a main peak indicative of the perovskite crystal structure (P1), or equivalently a different phase proportion expressed as ((P2/P1)× 100) in the X-ray diffraction pattern, is less than or equal to 30%, then the main crystal phase of the inorganic solid electrolyte 2 will be defined as the perovskite crystal structure.

In the inorganic solid electrolyte 2 whose main crystal phase has a composition expressed by the compositional formula (B) given above, Li ions are allowed to migrate within the crystals of the composite oxide of perovskite crystal structure via vacancies in the A site comprising Li and La. Moreover, in the inorganic solid electrolyte 2 whose main crystal phase has a composition expressed by the compositional formula given above, since the Li ions can be accumulated at the interfaces between the inorganic solid electrolyte 2 and the current collectors 3A and 3B, and at the crystal grain boundary of the inorganic solid electrolyte 2, it is possible to form an electric double layer of high specific capacity by exploiting interfacial polarization that occurs at the interface between the inorganic solid electrolyte 2 and the current collectors 3A and 3B, and at the crystal grain boundary of the inorganic solid electrolyte 2.

Moreover, for example, in Japanese Unexamined Patent Publication JP-A 2008-130844, there is described an exemplification of an electric double layer capacitor in which an oxide of perovskite crystal structure expressed as $Li_{0.5}La_{0.5}TiO_3$ is used for the inorganic solid electrolyte 2. In this case, however, the expensiveness of La leads to an increase in costs. Furthermore, La has a disadvantage of a lack of stability in material supply.

In this regard, in the all-solid-state capacitor 1 of the present embodiment, in the inorganic solid electrolyte 2 having the main crystal phase expressed by the compositional formula (B) given above, the B site comprising Ti in the perovskite crystal structure is substituted in part for the element in Group 5 of the Periodic Table of Elements, which has a valence greater than that of Ti. This makes it possible to reduce the amount of La constituting the A site, and thereby provide the all-solid-state capacitor 1 at lower costs under steady product supplies.

Moreover, in the all-solid-state capacitor 1 of the present embodiment, in the main crystal phase having a composition expressed by the compositional formula (B) given above, the value "x" in the compositional formula fulfills the condition of $x \leq 0.5$. This makes it possible to secure a sufficient amount of A-site vacancies for migration of Li ions within the crystals of the composite oxide of perovskite crystal structure, and thereby provide the all-solid-state capacitor 1 which has a high capacitance and affords excellent frequency characteristics. Moreover, in the main crystal phase having a composition expressed by the compositional formula given above, since the value "α" in the compositional formula (B) fulfills the condition of $\alpha \leq 0.13$, it is possible to maintain the skeleton of perovskite crystal structure while reducing the number of La, as well as to provide pathways for the passage of Li ions via vacancies in the A site of perovskite crystal structure. Thus, there is provided the all-solid-state capacitor 1 which has a high capacitance and affords excellent frequency characteristics.

The all-solid-state capacitor 1 of the present embodiment employs the inorganic solid electrolyte 2 having the aforestated characteristics, and is thus implemented as the all-solid-state capacitor 1 which has a high capacitance, is excellent in frequency characteristics, and can be made compact.

Moreover, in the all-solid-state capacitor 1 pursuant to the invention, in the inorganic solid electrolyte 2 whose main crystal phase has a composition expressed by the compositional formula (B) given above, M', which is at least one of elements in Group 5 of the Periodic Table of Elements, includes at least one of Nb (niobium) and Ta (tantalum).

Since M', which is at least one of elements in Group 5 of the Periodic Table of Elements, includes at least one of Nb and Ta, it is possible to maintain the skeleton of perovskite crystal structure while reducing the number of La, as well as to provide pathways for the passage of Li ions via vacancies in the A site of perovskite crystal structure.

Moreover, the all-solid-state capacitor 1 of the present embodiment is preferably designed so that Li ions migrate mainly within crystal grains in the inorganic solid electrolyte 2. In light of this, the inorganic solid electrolyte 2 has preferably such a thickness that about several to ten crystal particles are present therein. More specifically, the inorganic solid electrolyte 2 has a thickness of 0.5 to 20 μm, or preferably a thickness of 1 to 10 μm. By adjusting the thickness of the inorganic solid electrolyte 2 to fall within such a range, it is possible to reduce variations in capacitance with different frequencies of voltage to be applied to the all-solid-state capacitor 1, in other words, frequency dependence of capacitance, and thereby implement a stable capacitor.

Moreover, in the all-solid-state capacitor 1 of the present embodiment, the current collectors 3A and 3B are each made of a metal material composed predominantly of at least one or more substances selected from among Au, Ag, and Cu, for example. Although the thickness of each of the current collectors 3A and 3B is not limited to any particular value, for example, it falls in the range of 0.5 to 3.0 μm.

Moreover, in the inorganic solid electrolyte 2 constituting the all-solid-state capacitor 1 of the present embodiment, as a different phase, one substance or two or more substances selected from among $LiNbO_3$, $Li_{10}Nb_6Ti_5O_{30}$, $Li_4Nb_2TiO_9$, and $LiTaO_3$ may additionally be contained so as to lie between crystal particles composed of the perovskite-structured main crystal phase. The presence of such a different phase makes it possible to impart higher electrical insulation capability to the inorganic solid electrolyte 2, and thereby allow the capacitor to afford high reliability even under application of high voltage or repetition of charge and discharge over a long period of time. In addition, occurrence of leakage current can be reduced.

Moreover, the inorganic solid electrolyte 2 may include, at the crystal grain boundary of crystal particles composed of the main crystal phase, a grain boundary phase composed of an amorphous phase or a crystal phase which differs from the main crystal phase, and this grain boundary phase may contain the element in Group 14 of the Periodic Table of Elements, and more specifically may contain Si or Ge. The crystal phase is composed of, for example, an oxide containing the element in Group 14 of the Periodic Table of Elements, such as $SiO_2$ or $GeO_2$, and, the amorphous phase is composed of, for example, glass containing the element in Group 14 of the Periodic Table of Elements, such as Si or Ge. The grain boundary phase may contain both of the crystal phase and the amorphous phase. The grain boundary phase may also contain Ti which is part of the constituents of the main crystal phase.

In the presence of such a grain boundary phase, the grain boundary resistance between crystal particles can be increased, and frequency dependence of the capacitance of the inorganic solid electrolyte 2 can be reduced, thus implementing a stable capacitor. Moreover, the electrical resistivity of the crystal grain boundary is preferably greater than or equal to $5 \times 10^2$ Ω·m.

The following describes an example of methods for manufacturing the all-solid-state capacitor 1 of the present embodiment.

In forming the all-solid-state capacitor 1, for example, the inorganic solid electrolyte 2 is fired first, and subsequently the current collectors 3A and 3B made of a metal material such as Au, Ag, or Cu are formed on the surface of the fired inorganic solid electrolyte 2 using an ion sputtering apparatus or otherwise. For example, the inorganic solid electrolyte 2 can be produced by following a procedure comprising a raw material mixing step, a primary pulverization step, a calcination step, a secondary pulverization step, and a firing step. For example, calcination is performed at a temperature of 1150° C. and under retention time of 2 hours, and, firing is performed at a temperature of 1150° C. and under retention time of 6 hours. In this way, the inorganic solid electrolyte 2 can be produced.

EXAMPLES

First Example

The following describes the first example corresponding to the first embodiment.

<Sample Formation>

Four raw materials, namely lithium carbonate, strontium carbonate, titanium oxide, and niobium pentoxide were mixed with varying mixing ratios to effect adjustments of x and α in the earlier described compositional formula (A) so that x=0.2, 0.3, 0.4 and 0.5, and x·Va (=x(α−x)/2)=0.015, 0.020, 0.030, 0.040, 0.045, 0.050, 0.060, 0.075 and 0.080 to form 15 different samples.

As a solvent, isopropyl alcohol (IPA) was added to each powder mixture obtained by mixing the above-mentioned raw powdery materials to prepare a slurry, and the slurry was subjected to blending pulverization process in a tumbling mill using 10-mm-diameter zirconia balls for 20 hours. After that, the slurry was dried, and then calcined in the atmosphere at a calcination temperature of 1100° C. and under retention time of 2 hours. Powder obtained through the calcination was crushed in a mortar, and then further pulverized in a tumbling mill using 3-mm-diameter zirconia balls for 96 hours (secondary pulverization step). Powder obtained through the secondary pulverization step was blended with 5% by mass of paraffin wax, and then press-molded into a compact under a pressure of 1 ton/cm² by mold pressing.

The compact was fired in the atmosphere at a firing temperature of 1100° C. and under retention time of 6 hours to obtain a sintered solid electrolyte in the form of a circular plate which is about 12 mm in diameter. The values of x, y, a, and x·Va in each sample are listed in Table 1.

Major constituents of each solid electrolyte sample thus obtained were analyzed by an ICP (Inductively Coupled Plasma) emission spectrophotometer (Type ICPS-8100 manufactured by Shimadzu Corporation). The result of analysis showed that the compositional constituent proportions in the fired sample substantially coincides with the compositional metal element proportions at the stage of raw material preparation, with the variation held within the analytical limit of tolerances.

<Sample Evaluation Method>

(Measurement of Relative Permittivity)

Each sample thus obtained was ground until it has a thickness of 520 to 810 μm, and, as a current collector, an Au electrode which is 10 mm in diameter was formed on each of the front and back sides of the sample by an ion sputtering apparatus. Next, AC voltage having a frequency ranging from 0.01 Hz to 1 MHz and an effective voltage value of 0.5 V was applied to each sample by an impedance measurement apparatus (Model SI1260 manufactured by Solartron Corporation) to measure a real part Z' and an imaginary part Z" of impedance Z. Note that the impedance Z is expressed in equation as Z=Z'−jZ", wherein j represents an imaginary unit.

On the basis of the measured real part Z' and imaginary part Z", capacitance Cp (F) was calculated, and also relative permittivity $\varepsilon_r$ was calculated.

The capacitance Cp was determined by calculation using a formula, $Cp=Z''/(2\pi f (Z'^2+Z''^2))$ wherein f represents frequency. The relative permittivity $\varepsilon_r$ was determined by calculation using a formula, $\varepsilon_r = Cp \times d/(\varepsilon_0 \times S)$, under a condition where a formula, $Cp=\varepsilon_0 \varepsilon_r \times S/d$, holds throughout the frequency range, wherein $\varepsilon_0$ represents a dielectric constant in a vacuum, S represents the area of electrode (current collector), and d represents the thickness of the inorganic solid electrolyte.

(Measurement of Resistivity at Crystal Grain Boundary)

Figure 2:
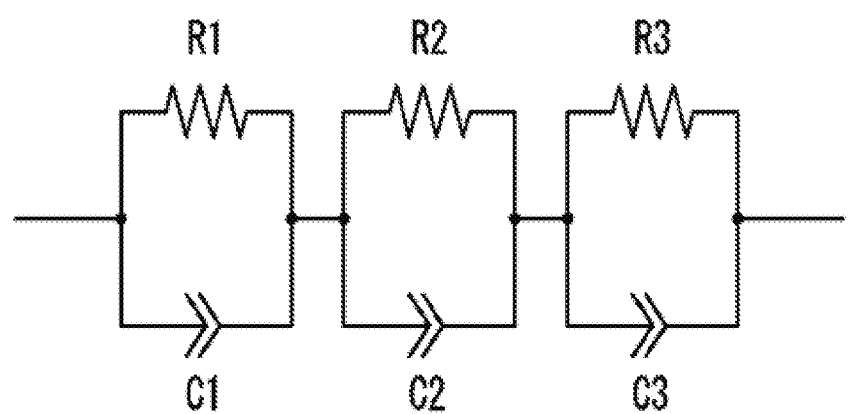
FIG. 2 is an equivalent circuit diagram used for impedance analysis.

Resistivity (Ωm) at a crystal grain boundary was calculated on the basis of (crystal grain boundary resistance R×electrode area S)/(inorganic solid electrolyte thickness d). The resistance R of the crystal grain boundary was calculated by performing impedance analysis using an equivalent circuit on the measured impedance of each sample. As electrical resistance components in the all-solid-state capacitor, the intra-grain resistance of the inorganic solid electrolyte, the grain boundary resistance of the inorganic solid electrolyte, and the resistance at the interface between the inorganic solid electrolyte and the current collector are designated by R1, R2, and R3, respectively, and, as capacitance components, the intra-crystal grain capacity of the inorganic solid electrolyte, the crystal grain boundary capacity of the inorganic solid electrolyte, and the capacity at the interface between the inorganic solid electrolyte and the current collector are designated by C1, C2, and C3, respectively. FIG. 2 is an equivalent circuit diagram used for impedance analysis. As shown in FIG. 2, in the equivalent circuit, a parallel circuit of the intra-grain resistance and the intra-crystal grain capacity in the inorganic solid electrolyte, a parallel circuit of the grain boundary resistance and the crystal grain boundary capacity in the inorganic solid electrolyte, and a parallel circuit of the interfacial resistance and the interfacial capacity between the inorganic solid electrolyte and the current collector were used. By performing impedance analysis using the equivalent circuit on the measured impedance of each all-solid-state capacitor employing the inorganic solid electrolyte of each sample, the resistance R of the crystal grain boundary can be determined, as the grain boundary resistance R2, by calculation.

Table 1 provides a listing of the values of x, y (=(2−x+α)/2), α, and x·Va representing the composition of each sample, and relative permittivity (measured at a frequency of 1 kHz) and resistivity (at crystal grain boundary) in each sample. Also listed in Table 1 is the result of determination as to whether the main crystal phase of each sample has a perovskite crystal structure based on its respective X-ray diffraction (XRD) pattern obtained by X-ray diffraction measurement under Cu-Kα radiation effected at 2θ ranging from 10 to 80° by the X-ray diffractometer. A sample in which a ratio of the peak intensity of a main peak indicative of a different phase (P2) to the peak intensity of a main peak indicative of the perovskite crystal structure (P1), or equivalently a different phase proportion expressed as ((P2/P1)×100), is less than or equal to 30% was judged as having a perovskite-structured main crystal phase, and marked with a circle "o" in the table, whereas a sample in which the different phase proportion exceeds 30% was judged as having no perovskite-structured main crystal phase, and marked with a cross "x".

TABLE 1

| Sample No. | x | y | α | x · Va | Relative permittivity | Crystal structure | Resistivity (Ωm) |
|---|---|---|---|---|---|---|---|
| A1 | 0.20 | 0.70 | 0.40 | 0.020 | 8.3 × 10³ | o | 3.1 × 10⁵ |
| A2 | 0.30 | 0.65 | 0.40 | 0.015 | 9.1 × 10³ | o | 1.4 × 10⁶ |
| A3 | 0.20 | 0.65 | 0.50 | 0.030 | 3.6 × 10⁴ | o | 1.9 × 10³ |
| A4 | 0.30 | 0.60 | 0.50 | 0.030 | 2.3 × 10⁴ | o | 1.9 × 10⁵ |
| A5 | 0.40 | 0.55 | 0.50 | 0.020 | 6.4 × 10³ | o | 8.7 × 10⁵ |
| A6 | 0.20 | 0.60 | 0.60 | 0.040 | 3.8 × 10⁴ | o | 9.9 × 10² |
| A7 | 0.30 | 0.55 | 0.60 | 0.045 | 4.6 × 10⁴ | o | 5.9 × 10³ |
| A8 | 0.40 | 0.50 | 0.60 | 0.040 | 1.7 × 10⁴ | o | 5.9 × 10⁴ |
| A9 | 0.20 | 0.55 | 0.70 | 0.050 | 1.9 × 10⁴ | o | 4.9 × 10³ |
| A10 | 0.30 | 0.50 | 0.70 | 0.060 | 1.4 × 10⁴ | o | 1.3 × 10⁴ |
| A11 | 0.40 | 0.45 | 0.70 | 0.060 | 1.1 × 10⁴ | o | 5.9 × 10⁴ |
| A12 | 0.20 | 0.50 | 0.80 | 0.060 | 3.4 × 10³ | x | 3.4 × 10⁵ |
| A13 | 0.30 | 0.45 | 0.80 | 0.075 | 2.8 × 10³ | x | 2.3 × 10⁵ |
| A14 | 0.40 | 0.40 | 0.80 | 0.080 | 1.9 × 10³ | x | 7.4 × 10⁵ |
| A15 | 0.50 | 0.35 | 0.80 | 0.075 | 1.3 × 10³ | x | 7.4 × 10⁵ |

Sample Nos. A1 through A11 implemented as examples of the invention were found to have a relative permittivity of greater than 5000 at a drive frequency of 1 kHz, and they could achieve a high relative permittivity even at a relatively high frequency. Sample Nos. A12 through A15 implemented as comparative examples were found to have a low relative permittivity, because their main crystal phases failed to sustain the perovskite crystal structure.

Moreover, as will be understood from Sample Nos. A3, A4, and A6 through A11, when α fulfilled the condition of 0.5≤α≤0.7, and x·Va fulfilled the condition of 0.03≤x·Va≤0.06, relative permittivity exceeded 10000. Accordingly, these samples could achieve a sufficiently high relative permittivity even at a relatively high frequency.

Figure 3:
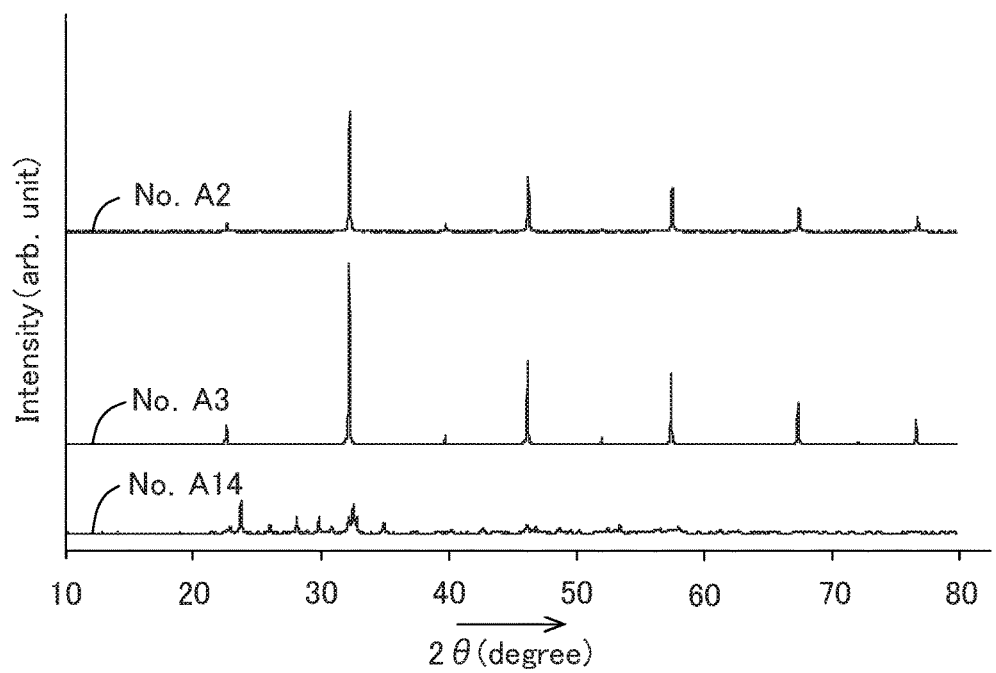
FIG. 3 is a chart indicating X-ray diffraction (XRD) patterns of the inorganic solid electrolyte of a first embodiment.

Moreover, in FIG. 3, there is shown the result of X-ray diffraction (XRD) pattern measurement on each representative sample (Sample Nos. A2, A3, and A14). FIG. 3 is a chart indicating X-ray diffraction (XRD) patterns of the inorganic solid electrolyte of the first embodiment. In addition, Table 2 provides a listing of the results of X-ray diffraction pattern measurement on these samples.

TABLE 2

| Sample No. | Peak intensity of main peak indicative of Perovskite crystal structure (P1) | Peak intensity of main peak indicative of different phase (P2) | Different phase proportion (%) (P2/P1) × 100 |
|---|---|---|---|
| A2 | 82455 | 0 | 0 |
| A3 | 81376 | 1676 | 2.1 |
| A14 | 9049 | 19604 | 216.6 |

As shown in FIG. 3, in each sample having a relative permittivity of greater than 5000 at a frequency of 1 kHz (Sample Nos. A2 and A3), as an indication of its main crystal phase, a peak corresponding to the perovskite crystal structure appeared, yet there was no noticeable sign of a different phase. As shown in Table 2, in each of Sample Nos. A2 and A3, the ratio of the peak intensity of the main peak indicative of a different phase (P2) to the peak intensity of the main peak indicative of the perovskite crystal structure (P1), or equivalently the different phase proportion expressed as ((P2/P1)×100) in the X-ray diffraction pattern, stood at a very low value, and more specifically 0% in Sample No. A2 and 2.1% in Sample No. A3.

On the other hand, in a sample having a relative permittivity of less than 5000 at a frequency of 1 kHz (Sample No. A14), although a peak corresponding to the perovskite crystal structure appeared, as indications of different phases, peaks corresponding to $LiNbO_3$ and $Sr_6Nb_{10}O_{30}$ appeared. In Sample No. A14, the different phase proportion stands at 216.6%, that is; P2 outstripped P1, wherefore it has been found that Sample No. A14 failed to sustain the perovskite crystal structure satisfactorily.

Second Example

The following describes the second example corresponding to the second embodiment.

<Sample Formation>

Raw material powder mixtures for Sample Nos. B1 through B28 were prepared by mixing four raw materials, namely lithium carbonate, lanthanum oxide, titanium oxide, and niobium pentoxide with varying mixing ratios, so that, in the inorganic solid electrolyte having a composition expressed by the earlier described compositional formula (B), x and a in the compositional formula take on different values, and more specifically x=0.18, 0.30, 0.42, and 0.50, and α=0.05, 0.10, 0.11, 0.12, 0.13, 0.20, and 0.30. In addition, a raw material powder mixture for Sample No. 29 was prepared, using tantalum pentoxide instead of niobium pentoxide, in a manner to set x at 0.42 and α at 0.10.

As a solvent, isopropyl alcohol (IPA) was added to each raw material powder mixture to prepare a slurry, and the slurry was subjected to blending pulverization process in a tumbling mill using 10-mm-diameter zirconia balls for 20 hours (primary pulverization step)

After that, the slurry was dried, and then calcined in the atmosphere at a calcination temperature of 1150° C. and under retention time of 2 hours. Powder obtained through the calcination was crushed in a mortar, and then further pulverized in a tumbling mill using 3-mm-diameter zirconia balls for 96 hours (secondary pulverization step). Powder obtained through the secondary pulverization step was blended with 5% by mass of paraffin wax, and then press-molded into a compact under a pressure of 1 ton/cm² by mold pressing.

The compact was fired in the atmosphere at a firing temperature of 1150° C. (the firing temperature was set at 1200° C. for Ta-containing compact) and under retention time of 6 hours to obtain a sintered inorganic solid electrolyte in the form of a circular plate which is about 12 mm in diameter.

The compositional proportions of major constituents, including Li, La, Ti, and Nb or Ta (element proportions) in each of 29 different samples thus obtained were analyzed by an ICP (Inductively Coupled Plasma) emission spectrophotometer (Type ICPS-8100 manufactured by Shimadzu Corporation). The result of analysis showed that the compositional constituent proportions in the fired sample substantially coincides with the compositional metal element proportions at the stage of raw material preparation, with the variation held within the analytical limit of tolerances.

<Sample Evaluation Method>

(Measurement of Relative Permittivity)

Each of 29 different samples thus obtained was ground until it has a thickness of 520 to 810 μm, and, as a current collector, an Au electrode which is 10 mm in diameter was formed on each of the front and back sides of the sample by an ion sputtering apparatus. Next, AC voltage having a frequency ranging from 0.01 Hz to 1 MHz and an effective voltage value of 0.5 V was applied to each sample by an impedance measurement apparatus (Model SI1260 manufactured by Solartron Corporation) to measure a real part Z' and an imaginary part Z" of impedance Z. Note that the impedance Z is expressed in equation as Z=Z'−jZ", wherein j represents an imaginary unit.

On the basis of the measured real part Z' and imaginary part Z", capacitance Cp (F) was calculated, and also relative permittivity $\varepsilon_r$ was calculated.

The capacitance Cp was determined by calculation using the formula, $Cp=Z''/(2\pi f (Z'^2+Z''^2))$ wherein f represents frequency. The relative permittivity $\varepsilon_r$ was determined by calculation using the formula, $\varepsilon_r=Cp \times d/(\varepsilon_0 \times S)$, under a condition where the formula, $Cp=\varepsilon_0 \varepsilon_r \times S/d$, holds throughout the frequency range, wherein $\varepsilon_0$ represents a dielectric constant in a vacuum, S represents the area of electrode (current collector), and d represents the thickness of the inorganic solid electrolyte.

(Measurement of Resistivity at Crystal Grain Boundary)

Resistivity (Ωm) at a crystal grain boundary was calculated on the basis of (crystal grain boundary resistance R×electrode area S)/(inorganic solid electrolyte thickness d). The resistance R of the crystal grain boundary was calculated by performing impedance analysis using an equivalent circuit on the measured impedance of each sample. As electrical resistance components in the all-solid-state capacitor, the intra-grain resistance of the inorganic solid electrolyte, the grain boundary resistance of the inorganic solid electrolyte, and the resistance at the interface between the inorganic solid electrolyte and the current collector are designated by R1, R2, and R3, respectively, and, as capacitance components, the intra-crystal grain capacity of the inorganic solid electrolyte, the crystal grain boundary capacity of the inorganic solid electrolyte, and the capacity at the interface between the inorganic solid electrolyte and the current collector are designated by C1, C2, and C3, respectively. FIG. 2 is an equivalent circuit diagram used for impedance analysis. As shown in FIG. 2, in the equivalent circuit, a parallel circuit of the intra-grain resistance and the intra-crystal grain capacity in the inorganic solid electrolyte, a parallel circuit of the grain boundary resistance and the crystal grain boundary capacity in the inorganic solid electrolyte, and a parallel circuit of the interfacial resistance and the interfacial capacity between the inorganic solid electrolyte and the current collector were used. By performing impedance analysis using the equivalent circuit on the measured impedance of each all-solid-state capacitor employing the inorganic solid electrolyte of each sample, the resistance R of the crystal grain boundary can be determined, as the grain boundary resistance R2, by calculation.

The results of evaluations on 29 different samples are listed in Table 3. More specifically, Table 3 provides a listing of the values of "x", "(2−x−α)/3", and "α" representing the compositional proportions in the earlier described compositional formula, relative permittivity $\varepsilon_r$ measured at a frequency of 1 kHz, and resistivity (at crystal grain boundary) for each sample (Sample Nos. B1 through B29).

Also listed in Table 3 is the result of determination as to whether the main crystal phase of each sample (Sample Nos. B1 through B29) has a perovskite crystal structure based on its respective X-ray diffraction (XRD) pattern obtained by X-ray diffraction measurement under Cu-Kα radiation effected at 2θ ranging from 10 to 80° by the X-ray diffractometer. A sample in which a ratio of the peak intensity of a main peak indicative of a different phase (P2) to the peak intensity of a main peak indicative of the perovskite crystal structure (P1), or equivalently a different phase proportion expressed as ((P2/P1)×100) in the X-ray diffraction pattern, is less than or equal to 30% was judged as having a perovskite-structured main crystal phase, and marked with a circle "o" in the table, whereas a sample in which the different phase proportion exceeds 30% was judged as having no perovskite-structured main crystal phase, and marked with a cross "x".

TABLE 3

| Sample No. | Compositional proportions in Compositional formula | | | Relative permittivity $\varepsilon_r$ at 1 kHz | Crystal structure | Resistivity (Ωm) |
|---|---|---|---|---|---|---|
| | x | (2 − x − α)/3 | α | | | |
| B1 | 0.18 | 0.59 | 0.05 | $6.1 \times 10^4$ | ○ | $9.4 \times 10^2$ |
| B2 | 0.30 | 0.55 | 0.05 | $6.5 \times 10^4$ | ○ | $1.6 \times 10^3$ |
| B3 | 0.42 | 0.51 | 0.05 | $5.1 \times 10^4$ | ○ | $1.8 \times 10^3$ |
| B4 | 0.50 | 0.48 | 0.05 | $4.3 \times 10^4$ | ○ | $8.8 \times 10^2$ |
| B5 | 0.18 | 0.57 | 0.10 | $3.1 \times 10^4$ | ○ | $5.9 \times 10^2$ |
| B6 | 0.30 | 0.53 | 0.10 | $3.3 \times 10^4$ | ○ | $9.8 \times 10^2$ |
| B7 | 0.42 | 0.49 | 0.10 | $2.6 \times 10^4$ | ○ | $1.1 \times 10^3$ |
| B8 | 0.50 | 0.47 | 0.10 | $2.2 \times 10^4$ | ○ | $5.5 \times 10^2$ |
| B9 | 0.18 | 0.57 | 0.11 | $2.1 \times 10^4$ | ○ | $5.8 \times 10^2$ |
| B10 | 0.30 | 0.53 | 0.11 | $2.2 \times 10^4$ | ○ | $9.7 \times 10^2$ |
| B11 | 0.42 | 0.49 | 0.11 | $1.8 \times 10^4$ | ○ | $1.1 \times 10^3$ |
| B12 | 0.50 | 0.46 | 0.11 | $1.5 \times 10^4$ | ○ | $5.4 \times 10^2$ |
| B13 | 0.18 | 0.57 | 0.12 | $1.4 \times 10^4$ | ○ | $5.8 \times 10^2$ |
| B14 | 0.30 | 0.53 | 0.12 | $1.5 \times 10^4$ | ○ | $9.6 \times 10^2$ |
| B15 | 0.42 | 0.49 | 0.12 | $1.2 \times 10^4$ | ○ | $1.1 \times 10^3$ |
| B16 | 0.50 | 0.46 | 0.12 | $9.9 \times 10^3$ | ○ | $5.4 \times 10^2$ |
| B17 | 0.18 | 0.56 | 0.13 | $9.3 \times 10^3$ | ○ | $5.7 \times 10^2$ |
| B18 | 0.30 | 0.52 | 0.13 | $9.9 \times 10^3$ | ○ | $9.5 \times 10^2$ |
| B19 | 0.42 | 0.48 | 0.13 | $7.8 \times 10^3$ | ○ | $1.1 \times 10^3$ |
| B20 | 0.50 | 0.46 | 0.13 | $6.6 \times 10^3$ | ○ | $5.3 \times 10^2$ |
| B21 | 0.18 | 0.54 | 0.20 | $5.6 \times 10^2$ | ○ | $5.4 \times 10^2$ |
| B22 | 0.30 | 0.50 | 0.20 | $6.0 \times 10^2$ | ○ | $8.9 \times 10^2$ |
| B23 | 0.42 | 0.46 | 0.20 | $4.7 \times 10^2$ | ○ | $1.0 \times 10^3$ |
| B24 | 0.50 | 0.43 | 0.20 | $4.0 \times 10^2$ | ○ | $5.0 \times 10^2$ |
| B25 | 0.18 | 0.51 | 0.30 | $1.1 \times 10^2$ | x | $5.0 \times 10^3$ |
| B26 | 0.30 | 0.47 | 0.30 | $1.2 \times 10^2$ | x | $8.4 \times 10^3$ |
| B27 | 0.42 | 0.43 | 0.30 | $9.3 \times 10^1$ | x | $9.4 \times 10^3$ |
| B28 | 0.50 | 0.40 | 0.30 | $7.8 \times 10^1$ | x | $4.7 \times 10^3$ |
| B29 | 0.42 | 0.49 | 0.10 | $5.6 \times 10^4$ | ○ | $2.8 \times 10^2$ |

As will be apparent from the results presented in Table 3, in each sample composed of the inorganic solid electrolyte having a composition expressed by the earlier described compositional formula (B) wherein x was less than or equal to 0.5, and α was less than or equal to 0.13 (Sample Nos. B1 through B20), the relative permittivity $\varepsilon_r$ measured at a frequency of 1 kHz was greater than or equal to $5.0 \times 10^3$, and, in each sample in which x was less than or equal to 0.5, and α was less than or equal to 0.11 (Sample Nos. B1 through B12), the relative permittivity $\varepsilon_r$ measured at a frequency of 1 kHz was greater than or equal to $1.0 \times 10^4$.

Moreover, in FIG. 4, there is shown the result of X-ray diffraction (XRD) pattern measurement on each representative sample (Sample Nos. B7, B23, and B27). FIG. 4 is a chart indicating X-ray diffraction (XRD) patterns of the inorganic solid electrolyte of the second embodiment. In addition, Table 4 provides a listing of the results of X-ray diffraction pattern measurement on these samples.

TABLE 4

| Sample No. | Peak intensity of main peak indicative of Perovskite crystal structure (P1) | Peak intensity of main peak indicative of different phase (P2) | Different phase proportion (%) (P2/P1) × 100 |
|---|---|---|---|
| B7 | 27179 | 114 | 0.4 |
| B23 | 11564 | 1558 | 13.5 |
| B27 | 6190 | 7476 | 120.8 |

As shown in FIG. 4, in a sample in which the relative permittivity $\varepsilon_r$ measured at a frequency of 1 kHz exceeded $1.0 \times 10^4$ (Sample No. B7), as an indication of its main crystal phase, a peak corresponding to the perovskite crystal structure appeared, yet there was no noticeable sign of a different phase. As shown in Table 4, in Sample No. B7, the ratio of the peak intensity of a main peak indicative of a different phase (P2) to the peak intensity of a main peak indicative of the perovskite crystal structure (P1), or equivalently the different phase proportion expressed as ((P2/P1)×100) in the X-ray diffraction pattern, stood at 0.4%, which was a very low value.

On the other hand, in a sample in which the relative permittivity $\varepsilon_r$ measured at a frequency of 1 kHz was less than $1.0 \times 10^4$ (Sample No. B23), although a peak corresponding to the perovskite crystal structure appeared as an indication of the main crystal phase, as an indication of a different phase, $LiNbTiO_6$ appeared. In Sample No. B23, the ratio of the peak intensity of the main peak indicative of the different phase (P2) to the peak intensity of the main peak indicative of the perovskite crystal structure (P1), or equivalently the different phase proportion expressed as ((P2/P1)×100) in the X-ray diffraction pattern, stood at 13.5%, which was higher than the different phase proportion in Sample B7.

Moreover, in another sample in which the relative permittivity $\varepsilon_r$ measured at a frequency of 1 kHz was less than $1.0 \times 10^4$ (Sample No. B27), the peak intensity in the perovskite crystal structure decreased, and, as indications of different phases, for example, $LiNbTiO_6$ and $LiTi_2O_4$ appeared. In Sample No. B27, the ratio of the peak intensity of the main peak indicative of the different phase (P2) to the peak intensity of the main peak indicative of the perovskite crystal structure (P1), or equivalently the different phase proportion expressed as ((P2/P1)×100) in the X-ray diffraction pattern, stood at 120.8%, which was a very high value.

From the results thus far described, it has been found that in each sample composed of the inorganic solid electrolyte having a composition expressed by the earlier described compositional formula (B) wherein x is less than or equal to 0.5, and a is less than or equal to 0.13 (Sample Nos. B1 through B20), the B site of the perovskite crystal structure was substituted in part for Nb having a valence greater than that of Ti to reduce the amount of La constituting the A site, and, the proportion of a different phase in the inorganic solid electrolyte stands at a very low value, that is; the perovskite crystal structure was defined as the main crystal phase, wherefore the relative permittivity $\varepsilon_r$ measured at a frequency of 1 kHz was greater than or equal to $5.0 \times 10^3$. Thus, it has been found that Sample Nos. B1 through B20 have a high capacitance and affords excellent frequency characteristics.

Moreover, Sample Nos. B30 and B31, each of which contained the element in Group 14 of the Periodic Table of Elements, such as $SiO_2$ or $GeO_2$, in its grain boundary phase, were formed. Sample No. B30 was obtained by adding 1.0% by mass of $SiO_2$ to Sample No. 7 (in which x=0.42, and α=0.10), and, Sample No. B31 was obtained by adding 1.0% by mass of $GeO_2$ to Sample No. 7 (in which x=0.42, and α=0.10). The presence of Si or Ge in the grain boundary phase was verified by a scanning electron microscope (SEM) and an energy dispersive X-ray spectrometry (EDS).

Sample Nos. B7, B30, and B31 were evaluated also for frequency dependence of relative permittivity. The frequency dependence of relative permittivity was determined by calculating a ratio of a relative permittivity at a frequency of 100 kHz to a relative permittivity at a frequency of 1 kHz ($\varepsilon_r$ (100 kHz)/$\varepsilon_r$ (1 kHz)). It can be determined that, as the value of the ratio is approximate to 1, frequency dependence of relative permittivity is small, or equivalently, the frequency dependence of the capacitance of the inorganic solid electrolyte is small. Table 5 provides a listing of the results of evaluation on Sample Nos. B7, B30, and B31 in respect of resistivity at crystal grain boundary and the frequency dependence of relative permittivity.

TABLE 5

| Sample No. | Relative permittivity $\varepsilon_r$ at 1 kHz | Crystal structure | Resistivity ($\Omega$m) | Frequency dependence $\varepsilon_r$ (100 kHz)/ $\varepsilon_r$ (1 kHz) |
|---|---|---|---|---|
| B7  | $2.6 \times 10^4$ | ○ | $1.1 \times 10^3$ | 0.06 |
| B30 | $2.1 \times 10^4$ | ○ | $2.6 \times 10^3$ | 0.21 |
| B31 | $2.6 \times 10^4$ | ○ | $1.2 \times 10^3$ | 0.18 |

From the results presented in Table 5, Sample Nos. B30 and B31, in which a Si- or Ge-containing grain boundary phase is present in the crystal grain boundary, were higher in crystal grain boundary resistivity and thus lower in the frequency dependence of relative permittivity than Sample No. B7 free of a Si- or Ge-containing grain boundary phase. More specifically, the value of the dependence in Sample No. B7 was 0.06, whereas those in Sample Nos. B30 and B31 are 0.21 and 0.18, respectively, that were closer to 1.

REFERENCE SIGNS LIST

1: All-solid-state capacitor
2: Inorganic solid electrolyte
3A, 3B: Current collector

The invention claimed is:

1. An all-solid-state capacitor, comprising:
an inorganic solid electrolyte having a polycrystalline structure, the polycrystalline structure being composed of crystal particles and a crystal grain boundary formed between the crystal particles; and
a pair of current collectors disposed so as to hold the inorganic solid electrolyte in between,
the inorganic solid electrolyte having a main crystal phase of perovskite crystal structure that is expressed by a general formula, $ABO_3$,
A-site elements of the main crystal phase comprising Li and M which is at least one of elements in Group 2 of the Periodic Table of Elements, and
B-site elements of the main crystal phase comprising Ti and M' which is at least one of elements in Group 5 of the Periodic Table of Elements,
wherein an electrical resistivity at the crystal grain boundary in the inorganic solid electrolyte is greater than or equal to $5 \times 10^2$ $\Omega$·m,
wherein a grain boundary phase is present at the crystal grain boundary of the crystal particles composed of the main crystal phase, and the grain boundary phase is composed of an amorphous phase or a crystal phase which differs from the main crystal phase.

2. The all-solid-state capacitor according to claim 1, wherein the main crystal phase is expressed by a compositional formula, $Li_xM_{(2-x-\alpha)}Ti_{1-\alpha}M'_\alpha O_3$ in which $0.5 \leq \alpha \leq 0.7$ and $0.03 \leq x(\alpha-x)/2 \leq 0.06$.

3. The all-solid-state capacitor according to claim 1, wherein the element M includes Sr.

4. The all-solid-state capacitor according to claim 1, wherein M', which is at least one of elements in Group 5 of the Periodic Table of Elements, includes at least one of Nb and Ta.

5. The all-solid-state capacitor according to claim 1, wherein the grain boundary phase comprises at least one element of Si and Ge.

6. The all-solid-state capacitor according to claim 1, the all-solid-state capacitor including an electric double layer capacitor.

7. An all-solid-state capacitor, comprising:
an inorganic solid electrolyte having a polycrystalline structure, the polycrystalline structure being composed of crystal particles and a crystal grain boundary formed between the crystal particles; and
a pair of current collectors disposed so as to hold the inorganic solid electrolyte in between,
the inorganic solid electrolyte having a main crystal phase of perovskite crystal structure that is expressed by a general formula, $ABO_3$, and comprises Li, La, Ti, and M' which is at least one of elements in Group 5 of the Periodic Table of Elements, and
the main crystal phase being expressed by a compositional formula, $Li_xLa_{(2-x-\alpha)/3}Ti_{(1-\alpha)}M'_\alpha O_3$ in which $0<x\leq0.5$, and $0<a\leq0.13$.

8. The all-solid-state capacitor according to claim 7, wherein M', which is at least one of elements in Group 5 of the Periodic Table of Elements, includes at least one of Nb and Ta.

9. The all-solid-state capacitor according to claim 7, wherein a grain boundary phase composed of an amorphous phase or a crystal phase which differs from the main crystal phase is present at the crystal grain boundary of the crystal particles composed of the main crystal phase.

10. The all-solid-state capacitor according to claim 9, wherein the grain boundary phase comprises at least one element of Si and Ge.

11. The all-solid-state capacitor according to claim 7, wherein an electrical resistivity at the crystal grain boundary in the inorganic solid electrolyte is greater than or equal to $5 \times 10^2$ $\Omega$·m.

12. The all-solid-state capacitor according to claim 7, the all-solid-state capacitor including an electric double layer capacitor.

* * * * *